(12) United States Patent
Kuehne

(10) Patent No.: US 6,754,430 B1
(45) Date of Patent: Jun. 22, 2004

(54) CABLE CONNECTOR AND METHOD FOR ATTACHMENT

(75) Inventor: Henning Kuehne, Dana Point, CA (US)

(73) Assignee: QPC Fiber Optic, Inc., San Clements, CA (US)

( * ) Notice: Subject to any disclaimer, the term of this patent is extended or adjusted under 35 U.S.C. 154(b) by 0 days.

(21) Appl. No.: 10/300,533

(22) Filed: Nov. 20, 2002

Related U.S. Application Data

(60) Provisional application No. 60/404,555, filed on Aug. 19, 2002.

(51) Int. Cl.[7] ................................................ G02B 6/00
(52) U.S. Cl. .................................. 385/138; 174/152 G
(58) Field of Search ................................ 385/135–138; 174/151, 152 R, 152 G

(56) References Cited

U.S. PATENT DOCUMENTS

| 5,425,121 A | | 6/1995 | Cooke et al. ................ 385/112 |
| 6,294,734 B1 | * | 9/2001 | Daoud ........................ 174/65 R |
| 6,335,488 B1 | * | 1/2002 | Gretz ......................... 174/65 G |
| 6,573,450 B2 | * | 6/2003 | Saito et al. ................. 174/65 G |

* cited by examiner

*Primary Examiner*—Kheim Nguyen
(74) *Attorney, Agent, or Firm*—Ralph D. Chabot

(57) ABSTRACT

A coupling device to secure a communication cable to a cable box and method to attach are disclosed. The coupling device comprises a coupling nut permanently affixed to one end of a communication cable and a coupling ring, which, on one side is designed to be threadably connected to the coupling nut and on the other side to be threadably connected to a cable box.

20 Claims, 2 Drawing Sheets

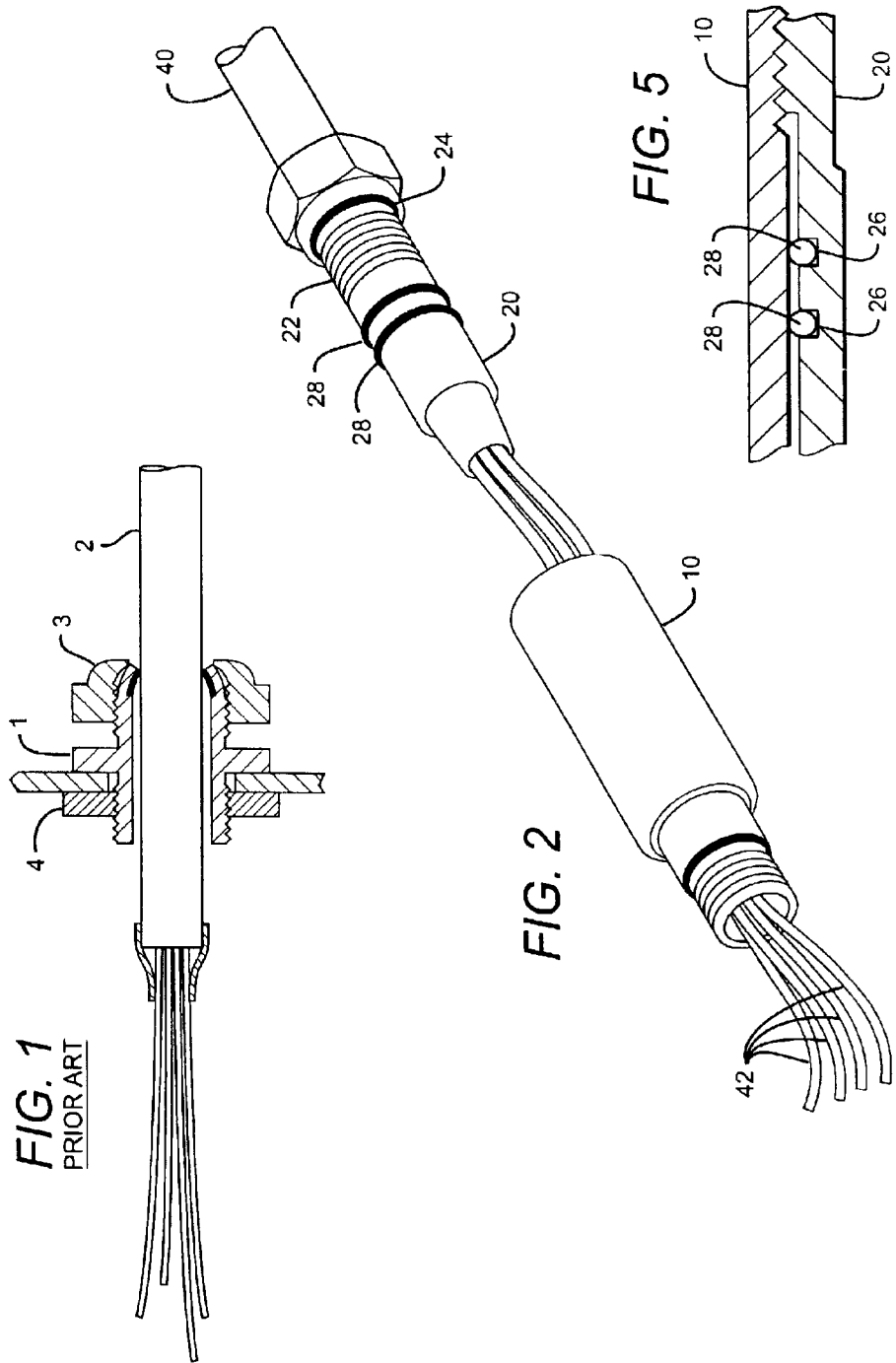

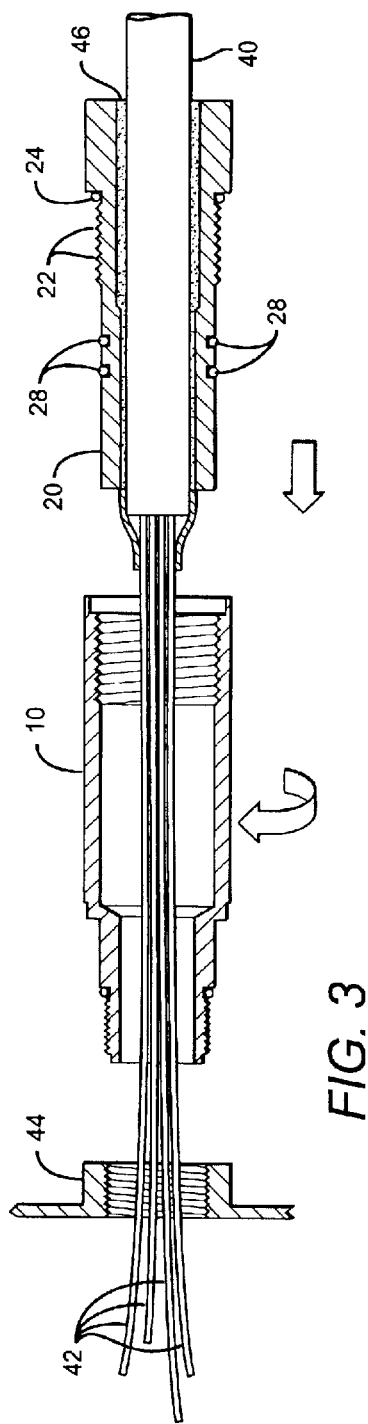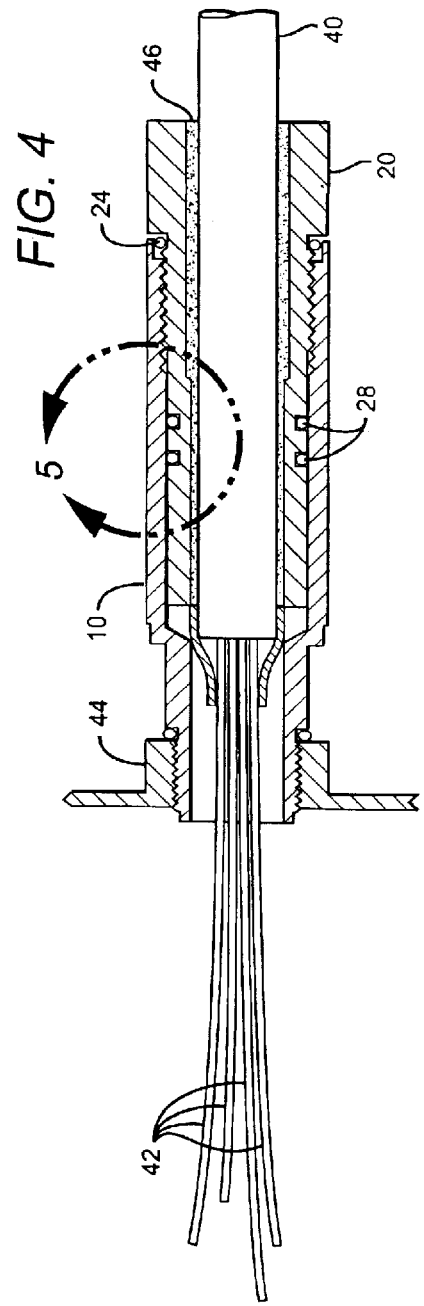

CABLE CONNECTOR AND METHOD FOR ATTACHMENT

PRIORITY CLAIM

This application claims the priority of U.S. Provisional Application bearing serial No. 60/404,555 filed on Aug. 19, 2002.

TECHNICAL FIELD

The field of invention is communication cables and specifically optical cable or fiber optic assemblies.

BACKGROUND OF THE INVENTION

Communication cables, i.e. cables which carry a plurality of fiber optic cables or the like, are in wide use in today's telecommunications industry. Communication cables are relatively long, frequently several hundred feet or longer. One end of the communication cable will be connected to a junction or cable box in which the fiber optic cables will be individually connected as required.

Installation of a communication cable to a cable box requires that a rigid, water-tight connection be made. In one prior art example illustrated by FIG. 1, the end of the communication cable for connecting to the cable box includes a coupling ring 1 having a male threaded outer surface which surrounds a center tunnel through which the communication cable 2 is run. A cable coupler 3 is tightened onto coupling ring 1 so that coupling ring frictionally engages the surface of communication cable 2. The other side of the coupling ring is then threadably connected to the cable box and nut 4 is used to secure in position.

In situations where ring 1 is first connected to the communication cable, it is necessary to rotate a portion of the communication cable as well.

This can cause a difficult installation in many situations. For example, an installing technician may not have sufficient length of free cable to easily rotate the cable (as tight working space and large bundles generally prevent this). To help alleviate this situation, today's available connectors generally require five to nine various components, requiring multiple tightenings and orientations during assembly which add to the complexity of the installation as well as the required time to install.

A second example is presented in U.S. Pat. No. 5,425,121 issued to Cooke et al. In Cooke et al, an entry nut is threaded to an optical entry port and then a main body and back nut is threaded to secure attachment. Finally heat shrinkable tubing is positioned and heated to provide a water-tight seal.

Besides the extra effort on the part of the installing technicians, the result is that the communication cable can be undesirably twisted and the force retained in the twisted cable may eventually loosen the connection at the cable box. Such loosening could permit moisture to enter and damage the fiber optic cable resulting potentially in a significant loss of performance.

SUMMARY OF THE INVENTION

The purpose of my invention was to develop a cable connector which would provide a water-tight seal and be capable of installation by simple hand tightening without the need for tools of any kind.

My invention incorporates the use of: 1) an elongated tubular coupling nut permanently affixed to one end of a communication cable; and, 2) an elongated tubular coupling ring, which, on one side is designed to be threadably connected to the coupling nut and on the other side is designed to be threadably connected to a cable box. The coupling ring and nut combination can be designed to accommodate communication cables of various sizes which carry a plurality of fiber optic cable or the like.

Operatively coupling a communication cable to a cable box requires that a water-tight connection be made in order for the fiber optics contained therein to function properly in various weather conditions. As described above, my invention consists of only two components, namely a coupling ring and a coupling nut of which, only the coupling ring is adjusted during the installation process. Use of only two components significantly increases the ease and efficiency of an installation, thereby reducing the overall installation cost.

The coupling nut is sized to receive or accept the outer dimension of the communication cable. The coupling nut therefore receives the communication cable partially therein by inserting the end portion of the communication cable into one end of my coupling nut. The adjacent portion of cable within the coupling nut is thereafter secured in place using a sealant, preferably an epoxy. A sufficient lead for each fiber optic cable extends from the communication cable through the coupling nut and eventually through the coupling ring and into the cable box. This length is necessary so that technicians can eventually feed the fiber optic cables into the cable box and have sufficient lead length to make all necessary connections.

To facilitate a fast on-site installation of the communication cable to the cable box, the coupling nut should be installed off-site. Therefore, when brought to the installation site, the coupling nut will be secured to the communication cable with the fiber optic leads extending from the coupling nut.

Once the communication cable is permanently secured to the coupling nut by allowing the sealant an opportunity to cure, the cable leads are then passed thru the coupling ring which is an elongated tubular member having threaded end connections on either side. These threaded end connections have opposite thread orientations.

In the preferred embodiment, the coupling ring has a set of female threads for engaging the male threads on the coupling nut. The cable leads are next fed into the existing cable box through a threaded aperture, which is typically female threaded. Each lead is now in position to be operatively connected within the cable box and the communication cable is ready to be physically connected using my coupling nut and coupling ring.

The coupling nut is inserted into the coupling ring and positioned for threadable engagement. The mating threads of both the coupling nut and coupling ring have a reverse thread interface relative to the set of mating threads of the coupling nut and cable box. This reverse thread interface is designed to require essentially the same number of turns to tighten as is the case for the coupling ring/cable box interface, preferably 7.5 turns for complete threaded engagement.

The coupling nut is designed with a first O-ring positioned at the base of the reverse male threads for providing a first water seal between the mating surfaces of the coupling ring and coupling nut.

The first O-ring is intended to form a water-tight seal by complete threaded engagement of the coupling ring to the coupling nut. However, in situations where the coupling ring is overtightened, the O-ring could be damaged; allowing the potential for moisture to migrate and damage the fiber optics. Further, if not sufficiently tightened, the O-ring may not form a proper seal.

To insure that moisture is prevented from reaching the fiber optic cables, I have designed a second O-ring for positioning about the coupling nut. The second O-ring is unique because it is not dependent upon threaded engagement; it is appropriately sized so that it extends across the annulus between coupling nut and coupling ring.

The second O-ring is seated within a machined seat made about the circumference of the coupling nut and preferably positioned on the opposite side of the reverse threads from the first O-ring.

Most preferably, a second machined seat substantially the same as the first machine seat, is also located on the coupling nut and designed to accept a third O-ring. The function of the second and third O-rings are identical and will now be discussed.

The second and third O-rings are appropriately sized to form a seal across the annular region between the coupling nut and coupling ring. The coupling ring is machined to have a smooth inner surface at least over the distance the O-rings must travel past the female threads of the coupling ring. The smooth interior finish prevents damage to the O-rings during installation, permits smoother insertion into the coupling ring and facilitates water-tight seals.

The coupling ring is positioned for threadable engagement to the existing cable box. Each set of thread lengths, directions, and structure on both the coupling nut and the coupling ring are designed so that only the coupling ring is rotated to thread the 3 units together (coupling nut and cable, coupling ring, and cable box) and will tighten at the same time, preferably, to within ⅛ of a turn at both the cable box/coupling ring interface and the coupling ring/coupling nut interface.

Once the cable box and coupling nut are both in position to be threadably engaged to the coupling ring, the coupling ring is rotated to simultaneously engage the coupling nut and cable box to the coupling ring.

The coupling ring is designed so that no special equipment is necessary and can be hand-tightened for proper attachment.

In the preferred embodiment, a smooth covering is snugly fitted over the coupling ring. The covering can be padded to or made of a deformable material which facilitates gripping by a human hand. The covering is used to discourage the use of tools which could be used to overtighten and damage the first O-ring seal.

The design of my invention encourages only hand-tightening since the seal performance of the O-rings across the annular region is independent of how tight the coupling ring is mated to the coupling nut. Therefore, a feature of my design is that specialized tools, or tools of any kind, are not required to properly tighten a communication cable to a cable box.

BRIEF DESCRIPTION OF THE DRAWINGS

FIG. 1 is a prior art device for securing a communication cable to a cable box.

FIG. 2 is a perspective view showing how the coupling nut and coupling ring with a preferred cover are aligned to one another.

FIG. 3 is a side view showing how the coupling ring without the preferred cover is positioned for threadable engagement.

FIG. 4 is a side view showing threadable engagement with the coupling ring cover not shown.

FIG. 5 is a view taken along line 5 of FIG. 4.

DETAILED DESCRIPTION OF THE PREFERRED EMBODIMENT

FIG. 2 is a general representation illustrating coupling ring 10, coupling nut 20, communication cable 40, and fiber optic leads 42.

Communication cable 40 is initially inserted into one end of coupling nut 20 with leads 42 extending out the other side. The annular region between communication cable 40 and coupling nut 20 is then filled with an epoxy 46 so that communication cable 40 is permanently secured and a water-tight seal is formed.

Coupling nut 20 has male threads 22 over a portion of its outer surface. At the base of male threads 22 is positioned a first O-ring 24. Forward of male threads 22 are machined a pair of seats 26 into which O-rings 28 are partially disposed.

As can be seen in FIG. 3 and FIG. 4, leads 42 are first inserted through coupling ring 10 and thereafter through a female threaded end coupling 44 which is attached to a cable box (not shown).

The female threads on coupling ring 10 and the male threads 22 on coupling nut 20 are reverse threaded relative to the male threads on coupling ring 10 and female threaded end coupling 44.

Once leads 42 are inserted into the cable box, coupling ring 10 is positioned so that it is ready for simultaneous engagement with coupling nut 20 and female threaded end coupling 44. Therefore, prior to threaded engagement, coupling nut 20 is inserted into coupling ring 10 so that O-rings 28 will be properly positioned, frictionally engaging the machined inner surface of coupling ring 10 to thereby form a water tight seal across the annular region between coupling ring 10 and coupling nut 20. FIG. 5 illustrates the relative position of O-rings 28 relative to coupling ring 10.

FIG. 4 illustrates the completed attachment after coupling ring 10 has been rotated by hand a sufficient number of times.

It should be noted that FIG. 2 shows an exterior cover about coupling ring 10. This exterior cover is selected to fit snugly about the coupling ring and also to provide a gripping surface for a human hand so that coupling ring 10 can be rotated without the use of hand tools. For ease of illustration, FIG. 3, FIG. 4, and FIG. 5 do not show the exterior cover but it is nevertheless considered to be part of the preferred embodiment.

I claim:

1. A method for connecting one end of a communication cable having a plurality of fiber optic cables contained therein and leads extending therefrom, to a cable box having a female threaded end coupling for securing said cable, comprising the steps of:

providing an elongated tubular coupling nut having a male threaded surface which has a reverse thread interface relative to the thread direction present on the female threaded end coupling, said tubular coupling nut sized to accept the outer dimension of the communication cable within;

inserting said leads and the end of said communication cable into one end of said tubular coupling nut such that the leads extend out the other end of said coupling nut;

applying a sufficient amount of a sealing compound to the annular region between the communication cable and said coupling nut to form a water-proof seal;

providing an elongated tubular coupling ring having a first end and a second end, the first end having a female threaded surface for threadably engaging said coupling nut and the second end having a male threaded surface for threadably engaging the female threaded end coupling on the cable box;

thereafter, inserting the leads and the other end of said coupling nut into said coupling ring and extending the leads through the female threaded end coupling and into the cable box so that each end of the coupling ring is in position to be threadably engaged to the female threaded end coupling on one side and to said coupling nut on the other; and, rotating said coupling ring to simultaneously tighten it to both the female threaded end coupling and said coupling nut.

2. The method of claim 1 wherein said coupling nut further comprises at least one machined seat about the circumference and a corresponding O-ring for each machined seat where each O-ring is sufficiently sized to partially remain in said respective machined seat and, when said coupling nut is inserted into said coupling ring, extend into frictional contact with said coupling ring to form a seal.

3. The method of claim 1 wherein said coupling nut incorporates an exterior cover to facilitate gripping by hand.

4. The method of claim 2 wherein said coupling nut incorporates an exterior cover to facilitate gripping by hand.

5. A connector device for operatively coupling a communication cable to a set of female threads located on a cable box, where the communication cable contains a plurality of fiber optics cables, a portion of each fiber optic cable extending from the communication cable to define separate leads, the connector device comprising:

an elongated coupling nut having a first and a second end, where the first end of said coupling nut is sufficiently sized for receiving the communication cable partially therein and having the leads extend through said coupling nut; where said coupling nut can be permanently secured about the adjacent portion of the communication cable to provide a watertight seal; said coupling nut further having a set of threads located adjacent to said second end where said set of threads are reverse threaded relative to the female threads located on the cable box; and, a coupling ring having two sets of threads for simultaneous threadable engagement with the female threads located on the cable box and the set of threads located adjacent to the second end of said coupling nut.

6. The connector device of claim 5 wherein said coupling nut further comprises at least one machined seat about the circumference and a corresponding O-ring for each machined seat where each O-ring is sufficiently sized to partially remain in said respective machined seat and, when said coupling nut is inserted into said coupling ring, extend into frictional contact with said coupling ring to form a seal.

7. The connector device of claim 5 wherein said coupling nut incorporates an exterior cover to facilitate gripping by hand.

8. The connector device of claim 6 wherein said coupling nut incorporates an exterior cover to facilitate gripping by hand.

9. The connector device of claim 5 where said set of threads located adjacent to the second end of said coupling nut are male threads.

10. The connector device of claim 9 wherein said coupling nut further comprises at least one machined seat about the circumference and a corresponding O-ring for each machined seat where each O-ring is sufficiently Sized to partially remain in said respective machined seat and, when said coupling nut is inserted into said coupling ring, extend into frictional contact with said coupling ring to form a seal.

11. The connector device of claim 10 wherein said coupling nut incorporates an exterior cover to facilitate gripping by hand.

12. The connector device of claim 5 where said set of threads located adjacent to the second end of said coupling nut are female threads.

13. The connector device of claim 12 wherein said coupling nut further comprises at least one machined seat about the circumference and a corresponding O-ring for each machined seat where each O-ring is sufficiently sized to partially remain in said respective machined seat and, when said coupling nut is inserted into said coupling ring, extend into frictional contact with said coupling ring to form a seal.

14. The connector device of claim 13 wherein said coupling nut incorporates an exterior cover to facilitate gripping by hand.

15. A connector device for operatively coupling a communication cable to a set of male threads located on a cable box, where the communication cable contains a plurality of fiber optics cables, a portion of each fiber optic cable extending from the communication cable to define separate leads, the connector device comprising:

an elongated coupling nut having a first and a second end, where the first end of said coupling nut is sufficiently sized for receiving the communication cable partially therein and having the leads extend through said coupling nut; where said coupling nut can be permanently secured about the adjacent portion of the communication cable to provide a watertight seal; said coupling nut further having a set of threads located adjacent to said second end where said set of threads are reverse threaded relative to the male threads located on the cable box; and, a coupling ring having two sets of threads for simultaneous threadable engagement with the male threads located on the cable box and the set of threads located adjacent to the second end of said coupling nut.

16. The connector device of claim 15 wherein said coupling nut further comprises at least one machined seat about the circumference and a corresponding O-ring for each machined seat where each O-ring is sufficiently sized to partially remain in said respective machined seat and, when said coupling nut is inserted into said coupling ring, extend into frictional contact with said coupling ring to form a seal.

17. The connector device of claim 15 wherein said coupling nut incorporates an exterior cover to facilitate gripping by hand.

18. The connector device of claim 16 wherein said coupling nut incorporates an exterior cover to facilitate gripping by hand.

19. The connector device of claim 15 where said set of threads located adjacent to the second end of said coupling nut are male threads.

20. The connector device or claim 6 where said set of threads located adjacent to the second end of said coupling nut are female threads.

* * * * *